(12) United States Patent
Zuk, Jr.

(10) Patent No.: US 7,011,755 B2
(45) Date of Patent: Mar. 14, 2006

(54) DISPOSABLE VACUUM FILTRATION FUNNEL WITH INTEGRAL PREFILTER

(76) Inventor: Peter Zuk, Jr., 258 Old Littleton Rd., Harvard, MA (US) 01451

( * ) Notice: Subject to any disclaimer, the term of this patent is extended or adjusted under 35 U.S.C. 154(b) by 0 days.

(21) Appl. No.: 10/159,761

(22) Filed: May 30, 2002

(65) Prior Publication Data

US 2003/0080045 A1    May 1, 2003

Related U.S. Application Data

(60) Provisional application No. 60/294,900, filed on May 31, 2001.

(51) Int. Cl.
*B01D 29/085* (2006.01)

(52) U.S. Cl. .................... 210/416.1; 277/918; 210/477; 210/467; 210/482; 210/479

(58) Field of Classification Search ............. 210/416.1, 210/488–489, 455, 467, 482, 232, 323.2, 210/406, 450, 451, 479, 480, 477; 141/331–345; D23/200; D7/700; 248/94; 277/918
See application file for complete search history.

(56) References Cited

U.S. PATENT DOCUMENTS

| | | | |
|---|---|---|---|
| 1,216,112 A * | 2/1917 | Greven ........................ 210/477 |
| 1,501,073 A * | 7/1924 | Stead ........................... 210/478 |
| 2,460,423 A * | 2/1949 | Kracklauer .................. 210/479 |
| 2,584,206 A * | 2/1952 | Hodsdon ..................... 210/445 |
| 2,818,178 A * | 12/1957 | Hodsdon ..................... 210/445 |
| 4,357,240 A * | 11/1982 | Mehra et al. ................ 210/455 |
| 4,614,585 A * | 9/1986 | Mehra et al. ........... 210/321.84 |
| 4,678,576 A * | 7/1987 | Leoncavallo ........... 210/321.87 |
| 4,689,147 A * | 8/1987 | Leoncavallo et al. ....... 210/232 |
| 4,702,834 A * | 10/1987 | Relyea .................. 210/321.78 |
| 4,944,876 A * | 7/1990 | Miller .................... 210/321.75 |
| 5,116,496 A * | 5/1992 | Scott ........................... 210/232 |
| 5,234,585 A * | 8/1993 | Zuk, Jr. ....................... 210/188 |
| 5,603,900 A * | 2/1997 | Clark et al. .................. 422/101 |
| 5,792,425 A * | 8/1998 | Clark et al. .................. 422/101 |
| 5,948,246 A * | 9/1999 | Zuk, Jr. ....................... 210/188 |
| 6,443,314 B1 * | 9/2002 | Shiraiwa et al. ............ 210/474 |
| 6,458,278 B1 * | 10/2002 | Leoncavallo et al. ....... 210/650 |
| 2003/0010708 A1 * | 1/2003 | Leocavallo et al. ......... 210/477 |

FOREIGN PATENT DOCUMENTS

| | | | |
|---|---|---|---|
| EP | 223323 A1 * | 5/1987 |
| EP | 618833 B1 * | 5/1996 |
| WO | WO 95/04585 * | 2/1995 |

* cited by examiner

*Primary Examiner*—Terry K. Cecil

(57) ABSTRACT

A filtration funnel with integral prefilter usable for filtering fluids. The integral prefilter is disposed above the final filter which is sealed to the funnel. The prefilter may contain one or more layers of prefilter material, and is sealed to the funnel with one or more seal rings. The funnel may be used with either vacuum or pressure.

20 Claims, 7 Drawing Sheets

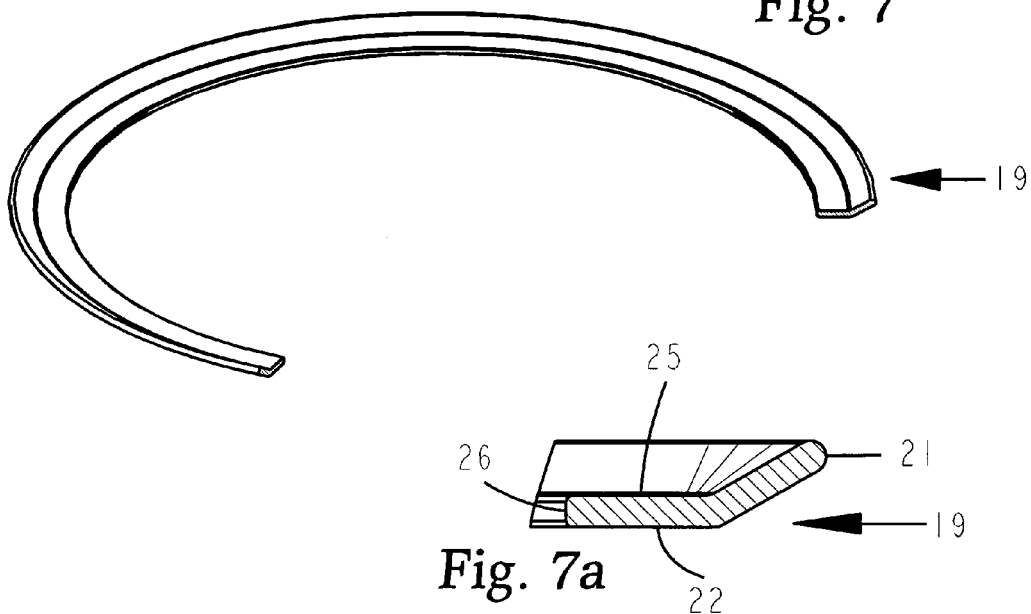
Fig. 7
Fig. 7a
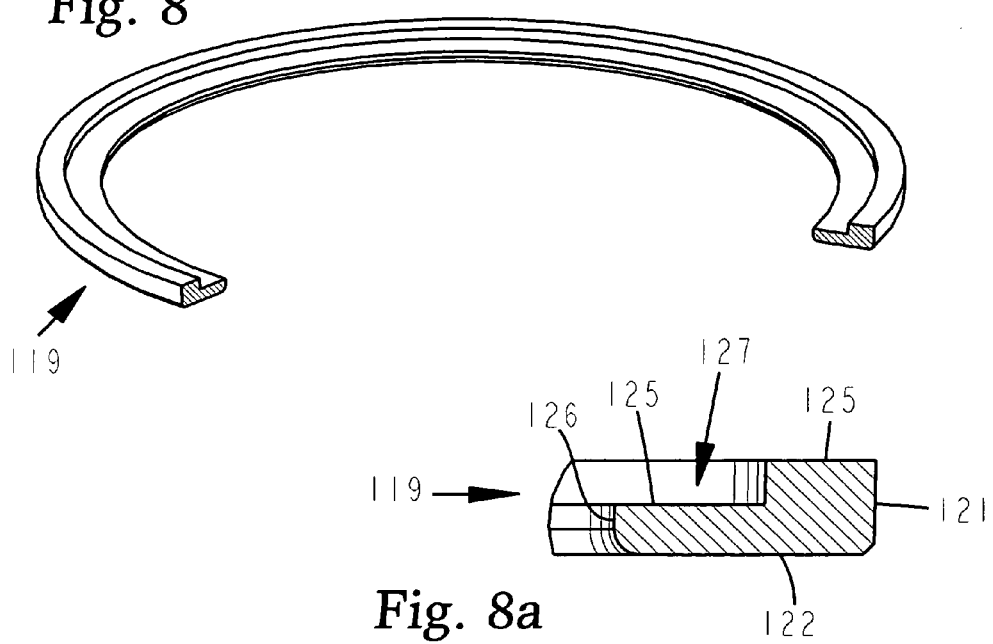
Fig. 8
Fig. 8a

DISPOSABLE VACUUM FILTRATION FUNNEL WITH INTEGRAL PREFILTER

Pursuant to 35 U.S.C. §119(e)(i), applicant claims priority of Provisional Application Ser. No. 60/294,900, filed: May 31, 2001

BACKGROUND OF THE INVENTION

This invention relates to the filtration field, and more particularly, to a disposable vacuum filtration funnel with an integral prefilter. Commercially available disposable vacuum filtration devices consist of a funnel that contains a microporous filter sealed to the funnel. The funnel may be attached to a disposable bottle, a reusable bottle, or to a manifold, so that the downstream side of the microporous filter is in fluid flow communication with the bottle or manifold. Fluid to be filtered is placed into the disposable funnel, and a negative pressure (i.e. vacuum) is applied to the bottle or manifold to which the disposable funnel is attached. The negative pressure in the bottle or manifold sucks the fluid through the microporous filter into the bottle or manifold. The pore size of the microporous filter is normally between 0.2 $\mu$m and 1.5 $\mu$m. The maximum volume of fluid that can be filtered by this type of filtration apparatus before the microporous filter becomes fouled, is limited by the surface area of the microporous filter. To increase the maximum volume of fluid that can be filtered by such an apparatus, the surface area of the microporous filter must be increased, which means that that the funnel size must be increased, which increases the cost of manufacturing the apparatus. Some manufacturers suggest placing a single layer of prefilter pad on top of the microporous filter to extend the throughput of the microporous filter. Because the prefilter pad will not be sealed to the disposable funnel, fluid to be filtered can bypass the prefilter, therefore the increase in throughput will be limited. It is therefore an object of the present invention to provide a means to add a multi-layer prefilter sealed to the disposable funnel, to increase the maximum volume of fluid that can be filtered by such an apparatus without increasing the surface area of the microporous filter.

SUMMARY OF THE INVENTION

The foregoing problems of the prior art are solved, and the objects of the present invention are achieved, by use of the disposable vacuum filtration funnel with integral prefilter constructed in accordance with the principles of the present invention. In accordance with the present invention, the prefilter for use with a vacuum filtration funnel contains one or more layers of prefilter material positioned on the upstream side of the vacuum filtration funnel's microporous filter. The one or more layer of prefilter material are held in place and sealed by a seal ring.

BRIEF DESCRIPTION OF THE DRAWINGS

These and other objects, features and advantages of the invention will be evident from the following detailed description when read in conjunction with the accompanying drawings in which:

FIG. 7 is an isometric view having portions thereof removed, of the seal ring depicted in FIG. 3, FIG. 4, and FIG. 5;

FIG. 7a is a partial cross-sectional view of the seal ring depicted in FIG. 7;

FIG. 8 is an isometric view having portions thereof removed, of the seal ring depicted in FIG. 6, FIG. 6a, FIG. 9, FIG. 9a, and FIG. 10;

FIG. 8a is a partial cross-sectional view of the seal ring depicted in FIG. 8;

DETAILED DESCRIPTION OF THE PREFERRED EMBODIMENTS

Although various embodiments of the disposable vacuum filtration funnel with integral prefilter constructed in accordance with the present invention are disclosed herein, each embodiment increases the maximum fluid volume that can be filtered by the disposable vacuum filtration funnel.

Figure 1:
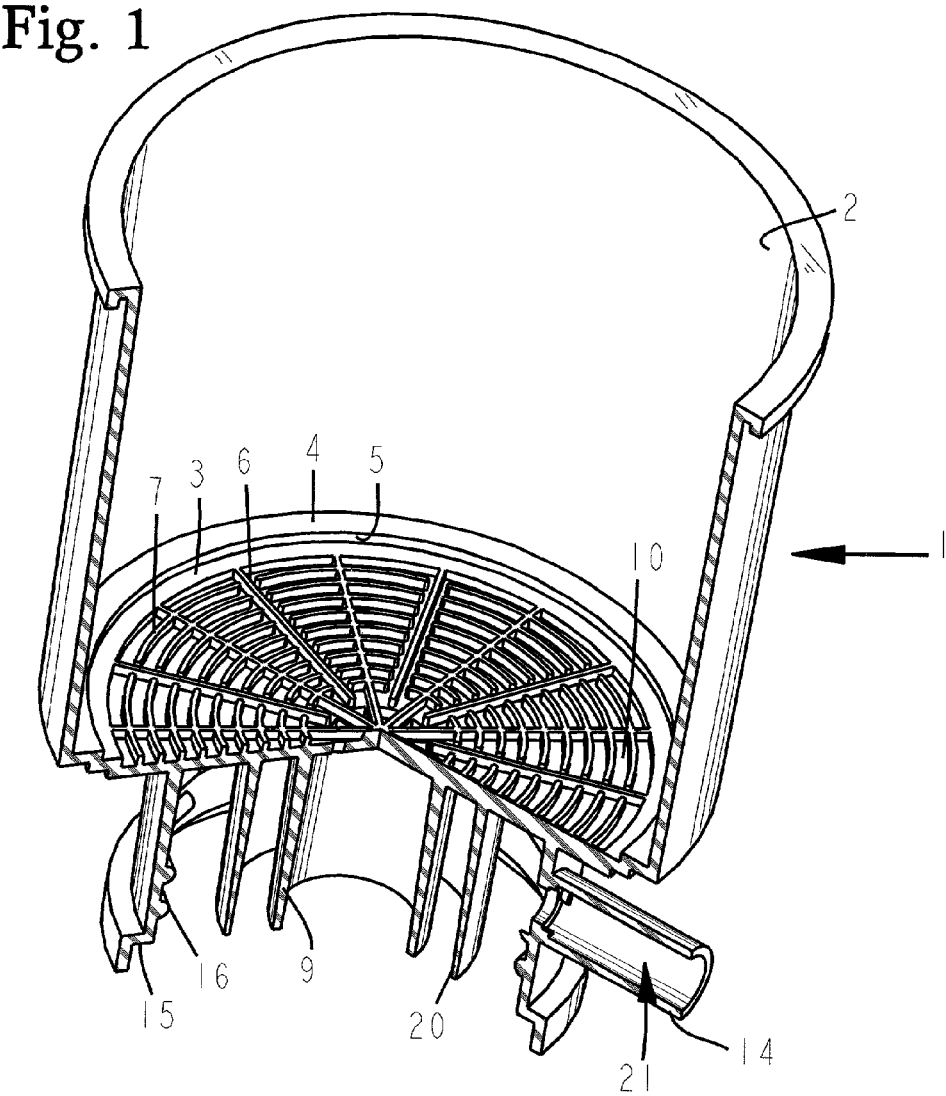
FIG. 1 is an isometric view, having portions thereof removed, of the funnel of the filtration apparatus depicted in FIG. 5.
Figure 2:
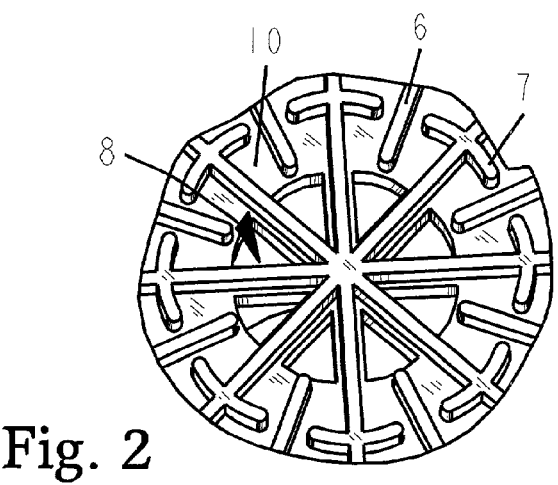
FIG. 2 is a partial isometric view, showing the central portion of the filter support and underdrain of the funnel depicted in FIG. 1.
Figure 3:
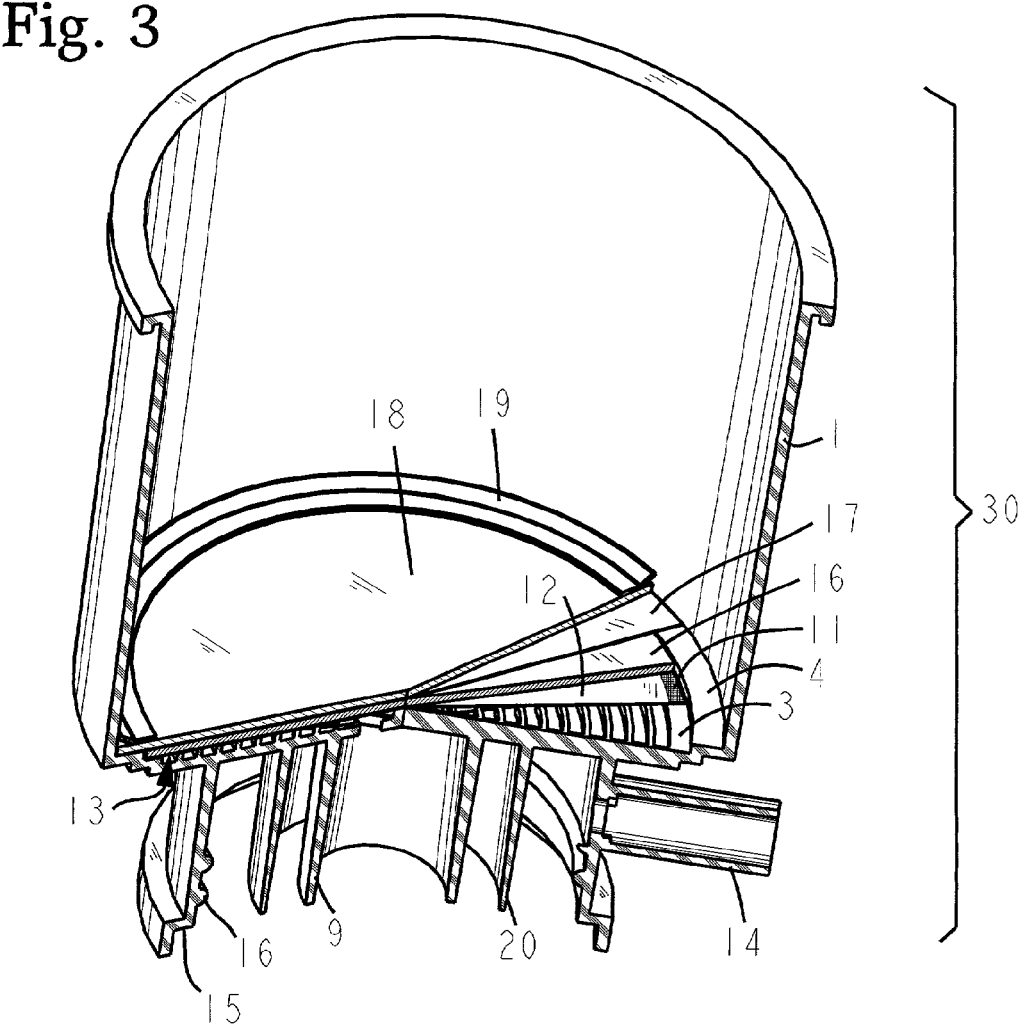
FIG. 3 is an isometric view, having portions thereof removed, of the assembled funnel depicted in FIG. 1 including a filter, three layers of prefilter, and a seal ring.

One embodiment of the disposable vacuum filtration funnel with integral prefilter constructed in accordance with the principles of the present invention, is shown in FIG. 1 through FIG. 5. FIG. 1 shows a typical vacuum filtration funnel 1. Vacuum filtration funnel 1 contains inner wall 2, which is typically round in shape, but could be of another shape such as square or rectangular. Vacuum filtration funnel 1 also contains filter seal surface 3, and prefilter seal surface 4. Vacuum filtration funnel 1 shows filter seal surface 3 is recessed below prefilter seal surface 4 a distance equal to the height of recess side wall 5. The height of recess side wall 5 should be approximately equal to the sum of the thickness of the final filter that is sealed to filter seal surface 3, and the thickness of the prefilter pad that is placed into the recess on top of said final filter. The final filter is normally a microporous filter, but could be any type of filter (such as a screen filter) that a particular application calls for. Filter seal surface 3 could be made co-planar with prefilter seal surface 4. Vacuum filtration funnel 1 also contains a filter underdrain structure, shown in FIG. 1 and FIG. 2 as a pattern of radial filter support ribs 6, and a pattern of segmented circular filter support ribs 7 protruding upward from surface 10, with surface 10 being recessed below filter seal surface 3. FIG. 2 shows that the filter underdrain also contains a pattern of outlet holes 8. The top surfaces of radial filter support ribs 6, and the top surfaces of segmented circular filter support ribs 7 should be approximately co-planar with filter seal surface 3. Referring to FIG. 1, vacuum filtration funnel 1 contains outlet tube 9. Referring to FIG. 3, final filter 12 is sealed to filter seal surface 3 of vacuum filtration funnel 1 by seal 11. Seal 11 is preferably a heat seal, but could be an ultra-sonic seal, a solvent seal, a glue seal, or any other type of leak tight seal. Referring to FIG. 1, FIG. 2, FIG. 3, and FIG. 4, with final filter 12 sealed to filter seal surface 3, chamber 13 is created. The voids between and around radial filter support ribs 6, and segmented circular filter support ribs 7, bound on top by the downstream surface of final filter 12, and on the bottom by surface 10 of vacuum filtration funnel 1, define chamber 13. Chamber 13 is in fluid flow communication with the interior of outlet tube 9 via outlet holes 8. Hence the filter underdrain structure provides support for final filter 12, and also places the downstream side of final filter 12 in fluid flow communication with the interior of outlet tube 9. The filter underdrain structure of funnel 1 could be replaced by any structure that provides support for final filter 12, and also places the downstream side of final filter 12 in fluid flow communication with the interior of outlet tube 9. Other filter underdrain structures that could be used, include a pattern of segmented circular ribs protruding from surface 10 (not shown), or a pattern of radial ribs protruding from surface 10 (shown in FIG. 9 as radial filter support ribs 206), or a pattern of pins protruding from surface 10 (not shown). Referring to FIG. 1, vacuum filtration funnel 1 contains outer tube 20, which facilitates locating vacuum filtration funnel 1 onto the mouth of a vacuum bottle. Outer tube 20 could be eliminated from vacuum filtration funnel 1 without affecting the performance of vacuum filtration funnel 1.

Figure 4:
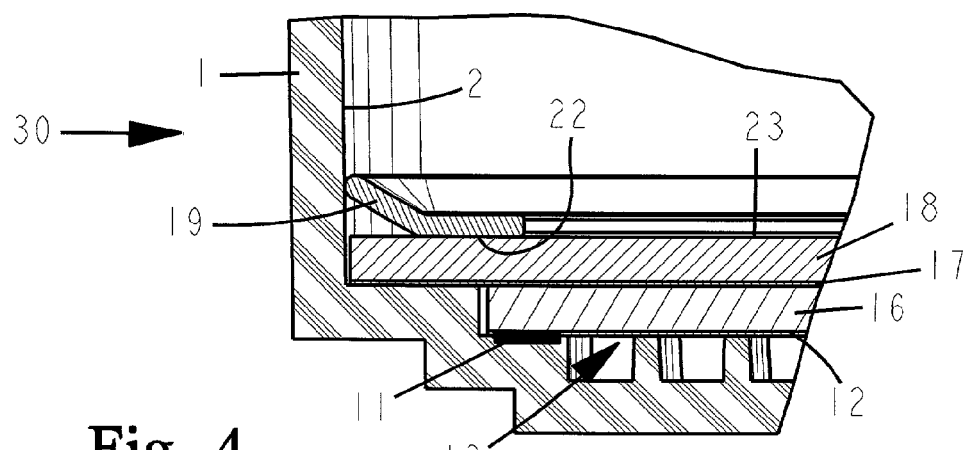
FIG. 4 is a partial cross-sectional view of the filter and prefilter seals of the funnel assembly depicted in FIG. 3.

Referring to FIG. 3 and FIG. 4, the outer periphery of final filter 12 is sealed to filter seal surface 3 of vacuum filtration funnel 1 with seal 11. Seal 11 is preferably a heat seal, but could be an ultra-sonic seal, a solvent seal, a glue seal, or any other type of leak tight seal. Final filter 12 divides vacuum filtration funnel 1 into two parts, a reservoir on the upstream side of final filter 12 for storing unfiltered fluid prior to filtration, and a filter support means on the downstream side of final filter 12. The filter support means supports final filter 12 and places the downstream side of final filter 12 in fluid flow communication with the outlet of vacuum filtration funnel 1. Vacuum filtration funnel 1 with final filter 12 sealed to it as just described comprises a typical vacuum filtration funnel that is commercially available at present. The maximum volume of any type of fluid that can be filtered with such a device for a given pore size, and a specified pressure differential, is directly proportional to the usable surface area of the final filter (i.e. the surface area inside the seal).

Adding a prefilter constructed in accordance with the principles of the present invention to the just described disposable vacuum filtration funnel will substantially increase the maximum volume of fluid that can be filtered with said vacuum filtration funnel. Referring to FIG. 3, FIG. 4, FIG. 7, and FIG. 7a, first prefilter 16 has the same diameter as final filter 12, and is positioned on top of final filter 12. Second prefilter 17 has a diameter equal to or slightly less than the maximum diameter of prefilter seal surface 4 of vacuum filtration funnel 1, and is positioned on top of first prefilter 16. Third prefilter 18 has the same diameter as second prefilter 17, and is positioned on top of second prefilter 17. Seal ring 19 shown in FIG. 7 and FIG. 7a, comprises a ring having a half cross-section (the half cross-section shown in FIG. 7a is defined as the portion of the full cross-section on one side of the vertical centerline of the seal ring) with a substantially horizontal top surface 25, and a substantially horizontal bottom surface 22, with an inner end surface 26 extending from the inner edge of top surface 25 to the inner edge of bottom surface 22, and with an outer end surface 21 extending from the outer edge of top surface 25 to the outer edge of bottom surface 22. The outer portion of top surface 25 and the outer portion of bottom surface 22 may slope upward as shown in FIG. 7a to facilitate pressing the seal ring into the funnel 30 so that the outer surface 21 of seal ring 19 forms a press fit with the inner wall 2 of funnel 30 as shown in FIG. 3 and FIG. 4. Outer surface 21 may also contain a round as shown in FIG. 7a. The shape and size of the perimeter of outer surface 21 of seal ring 19 substantially matches the shape and size of the perimeter of the portion of inner wall 2 of funnel 30 adjacent to outer surface 21 of seal ring 19 when seal ring 19 is inserted into funnel 30 as shown in FIG. 3. Hence, if inner wall 2 of funnel 30 is round, then outer surface 21 of seal ring 19 is made round to match inner wall 2 of funnel 30 as shown in FIG. 3. If the inner wall of the funnel were made square, then the outer surface 21 of seal ring 19 would be made square to match the inner wall of the funnel. The shape of the perimeter of inner surface 26 of seal ring 19 is substantially the same as the shape of the perimeter of outer surface 21 of seal ring 19, with the perimeter of inner surface 26 being offset inward from the perimeter of outer surface 21 at all points around the perimeter of outer surface 21 a sufficient distance to seal the outer periphery of the prefilters disposed below the bottom surface of seal ring 19. Thereby creating a through hole inside of the perimeter of inner surface 26, with the surface area of the through hole being substantially the same as the usable surface area of the final filter. Seal ring 19 is preferably press-fitted into vacuum filtration funnel 1, so that outer surface 21 of seal ring 19 presses against inner wall 2 of vacuum filtration funnel 1, and so that bottom surface 22 of seal ring 19 presses against top surface 23 (i.e. the upstream surface) of the outer periphery of third prefilter 18, thus sealing third prefilter 18 to vacuum filtration funnel 1. To facilitate the press fit, seal ring 19 is preferably made from a pliable material such as polypropylene or polyethylene, but is not limited to these materials. If vacuum filtration funnel 1 were made of a shape other than round, then final filter 12, and all of the prefilters, and the seal ring would be made in a shape to match that of the vacuum filtration funnel. Because the downstream side of each layer of prefilter is in intimate contact with the upstream side of the prefilter or final filter below it, all layers of prefilter will be effectively sealed to vacuum filtration funnel 1, with a non-absolute seal by seal ring 19. However, any bypass thin may occur around the outer edge of any layer of prefilter will be inconsequential. Because final filter 12 is sealed to vacuum filtration funnel 1 with a leak tight seal, there will not be any bypass to the downstream side of final filter 12. Alternately, seal ring 19 could be glued to vacuum filtration funnel 1, or solvent sealed to vacuum filtration funnel 1, or ultrasonically welded to vacuum filtration funnel 1, or sealed by any other means to vacuum filtration funnel 1. If third prefilter 18 is compressible (i.e. an absorbent pad depth filter), then seal ring 19 may be pressed into vacuum filtration funnel 1, deep enough to compress the outer periphery of third prefilter 18. If desired, additional layers of prefilter having the same diameter second prefilter 17 could placed on top of third prefilter 18 before seal ring 19 is press-fitted into place. Alternately, third prefilter 18 and second prefilter 17 could be eliminated, and seal ring 19 could be press-fitted into vacuum filtration funnel 1, so that bottom surface 22 of seal ring 19 presses against the top surface (i.e. the upstream surface) of first prefilter 16. Other combinations of prefilters could also be used.

Figure 5:
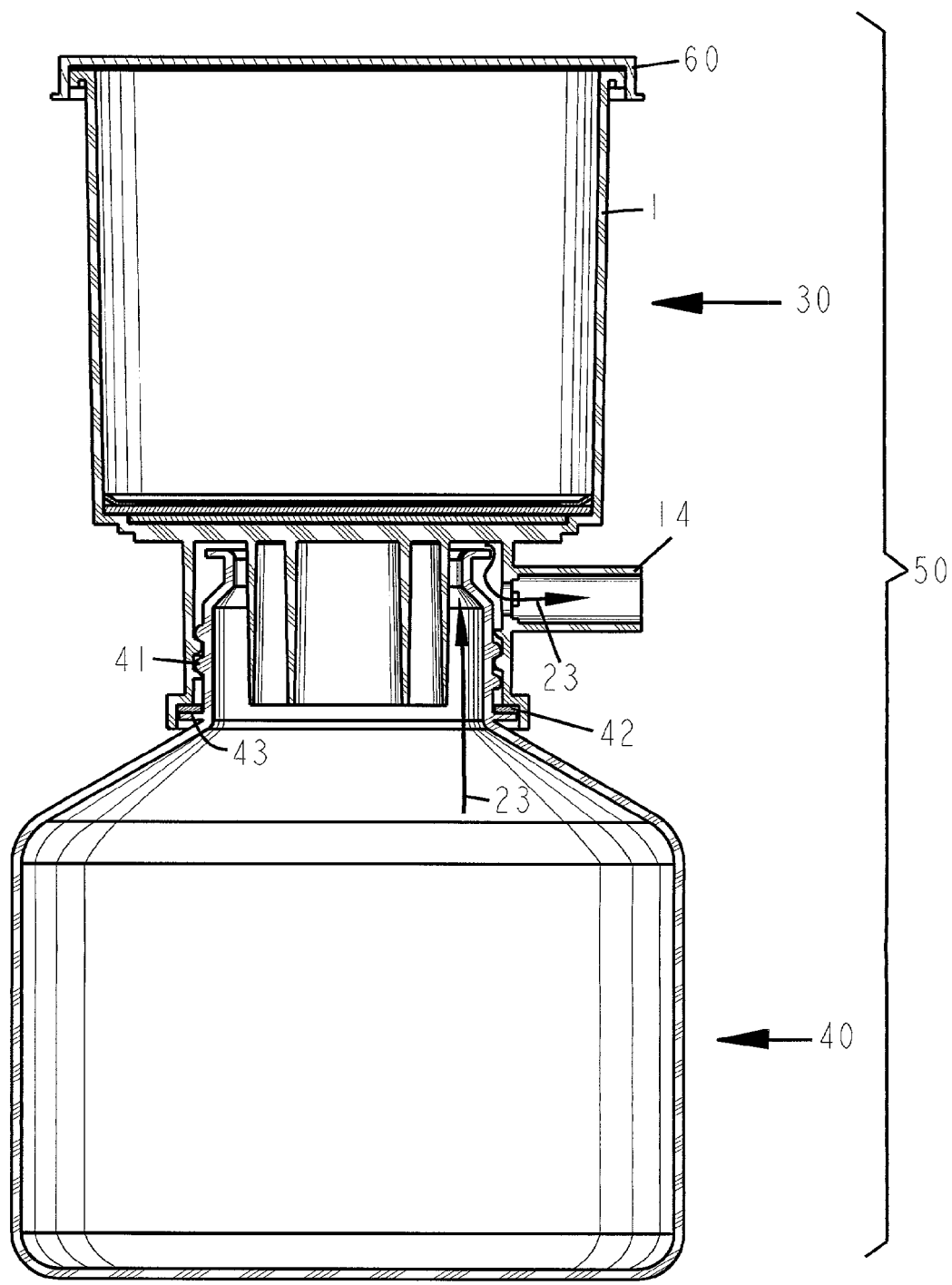
FIG. 5 is a cross-sectional view of a vacuum filtration apparatus with the assembled funnel depicted in FIG. 3, attached to a vacuum bottle, using a threaded connection.

Referring to FIG. 3 and FIG. 5, vacuum filtration funnel assembly 30 is attached to vacuum bottle 40 with thread 16 of vacuum filtration funnel 1 engaging thread 41 of vacuum bottle 40, to create assembly 50. Vacuum filtration funnel 1 is sealed to vacuum bottle 40 by sufficiently screwing vacuum filtration funnel onto vacuum bottle 40 to compress gasket 42 between gasket surface 15 of vacuum filtration funnel 1, and gasket surface 43 of vacuum bottle 40, thereby creating a leak tight seal. Assembly 50 may contain vented lid 60.

Referring to FIG. 1 through FIG. 5, assembly 50 is used in the following manner. Vented lid 60 is removed from vacuum filtration funnel assembly 30, then the fluid to be filtered is poured into vacuum filtration funnel assembly 30. Vented lid 60 may then be replaced onto the top of vacuum filtration funnel assembly 30. A negative pressure (i.e. vacuum) is applied to the interior of vacuum tube 14 of vacuum filtration funnel 1. This creates a negative pressure in the interior of vacuum bottle 40, by sucking air out of the interior of vacuum bottle 40 via the path illustrated by arrows 23. As explained above, chamber 13 (of the filter underdrain structure) of vacuum filtration funnel assembly 30 is in fluid flow communication with the interior of outlet tube 9 of vacuum filtration funnel 1. When vacuum filtration funnel assembly 30 is screwed onto vacuum bottle 40, the interior of outlet tube 9 of vacuum filtration funnel 1 is placed in fluid flow communication with the interior of vacuum bottle 40. Hence, the negative pressure in the interior of vacuum bottle 40 is applied to the downstream side of final filter 12, via the interior of outlet tube 9, and chamber 13, both of vacuum filtration funnel assembly 30. The pressure at the top of the fluid in vacuum filtration funnel assembly 30 will be atmospheric, and the pressure at the bottom of the fluid in vacuum filtration funnel assembly 30 will be equal to the positive head pressure caused by the column of fluid in vacuum filtration funnel assembly 30. Hence the differential pressure across the final filter and prefilters in vacuum filtration funnel assembly 30, will be equal to the difference between the positive pressure at the upstream side of the uppermost prefilter and the negative pressure in vacuum bottle 40. This pressure differential will suck the fluid sequentially through the layers of prefilter, then through final filter 12, through chamber 13, into the interior of outlet tube 9, and finally into vacuum bottle 40. Making the bottom edge of outlet tube 9 of vacuum filtration funnel 1 lower than the bottom edge of vacuum tube 14 of vacuum filtration funnel 1 will prevent fluid from being sucked out of vacuum bottle 40 through the interior of vacuum tube 14.

Referring to FIG. 3, FIG. 4 and FIG. 5, various combinations of final filter 12 and prefilters may be used depending upon the type of fluid to be filtered. For example, final filter 12 could be a microporous filter with a pore size of 0.2 $\mu$m, first prefilter 16 could be a very open pore size spun bound material such as Reemay (manufactured by Reemay, Old Hickory, Tn.), second prefilter 17 could be a microporous filter with a pore size in the range of 0.6 $\mu$m to 1.2 $\mu$m, and third prefilter 18 could be a depth filter chosen to protect second prefilter 17, and to have a much greater capacity to retain contaminants than the microporous filters have. In this combination the Reemay would be used as a flow distributor between the 0.2 $\mu$m final microporous filter and the 0.6 $\mu$m to 1.2 $\mu$m microporous filter upstream of it. With the structure of the flow distributor allowing liquid to flow through it in both the vertical and horizontal directions. Materials other than Reemay that allow liquid to flow through them in both the vertical and horizontal directions, such as screen filters, could also be used as a flow distributor. This combination of filter materials will guarantee that no contaminant greater than 0.2 $\mu$m in size will pass from the vacuum filtration funnel assembly 30 into the vacuum bottle 40, and also guarantee that the maximum volume of fluid that can be filtered by vacuum filtration funnel assembly 30 will be much greater than volume that would be filtered with the same vacuum filtration funnel without the prefilters.

Any other combination of depth filters and microporous filters could be used to construct a disposable vacuum filtration funnel with integral prefilter in accordance with the principles of the present invention. Or the prefilter could be constructed using one or more layers of depth filters, without any microporous filters. Alternately the prefilter could be constructed using one or more layers of microporous filters.

Figure 6:
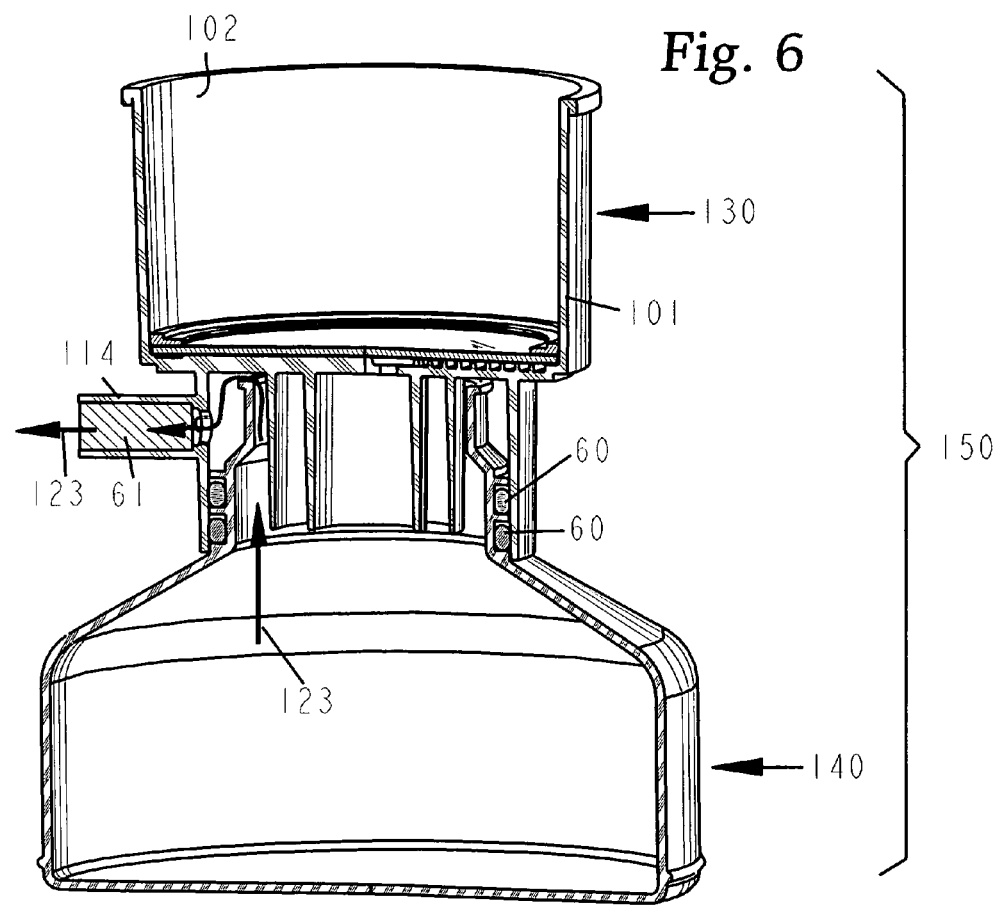
FIG. 6 is an isometric view, having portions thereof removed, of a second embodiment of a vacuum filtration apparatus containing a filter and two layers of prefilter, with the funnel attached to the vacuum bottle with an o-ring seal.
Figure 6A:
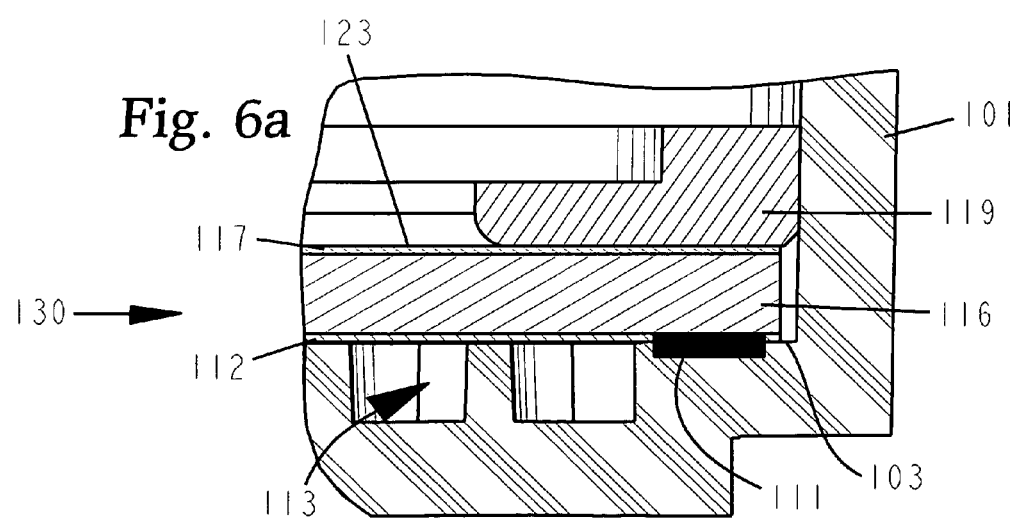
FIG. 6a is a partial cross-sectional view of the filter and prefilter seals of the funnel depicted in FIG. 6.

A second embodiment of the disposable vacuum filtration funnel with integral prefilter constructed in accordance with the principles of the present invention, is shown in FIG. 6, FIG. 6a, FIG. 8, and FIG. 8a. In this embodiment vacuum filtration funnel assembly 130 is sealed to vacuum bottle 140 by o-rings 60. Vacuum tube 114 of vacuum filtration funnel 101 may contain filter 61. Filter 61 is used to maintain sterility within the interior of vacuum bottle 140, and in the path shown by arrows 123 on the bottle side of filter 61. Referring to FIG. 6a, FIG. 8, and FIG. 8a, final filter 112 is sealed to filter seal surface 103 of vacuum filtration funnel 101 by seal 111. Seal 111 is preferably a heat seal, but could be an ultra-sonic seal, a solvent seal, a glue seal, or any other type of leak tight seal. First prefilter 116 is positioned on top of final filter 112, and has the same diameter as final filter 112. Second prefilter 117 is positioned on top of first prefilter 116, and has the same diameter as final filter 112. Seal ring 119 shown in FIG. 8 and FIG. 8a, comprises a ring having a half cross-section (the half cross-section is shown in FIG. 8a and is defined as the portion of the full cross-section on one side of the vertical centerline of the seal ring) with a substantially horizontal top surface 125, and a substantially horizontal bottom surface 122, with an inner end surface 126 extending from the inner edge of top surface 125 to the inner edge of bottom surface 122, and with an outer end surface 121 extending from the outer edge of top surface 125 to the outer edge of bottom surface 122. Top surface 125 may include step 127 as shown in FIG. 8a. The shape and size of the perimeter of outer surface 121 of seal ring 119 substantially matches the shape and size of the perimeter of the portion of inner wall 102 of funnel 130 adjacent to outer surface 121 of seal ring 119 when seal ring 119 is inserted into funnel 130 as shown in FIG. 6 and FIG. 6a. Hence, if inner wall 102 of funnel 130 is round, then outer surface 121 of seal ring 119 is made round to match inner wall 102 of funnel 130 as shown in FIG. 6. If the inner wall of the funnel were made square, then the outer surface 121 of seal ring 119 would be made square to match the inner wall of the funnel. The shape of the perimeter of inner surface 126 of seal ring 119 is substantially the same as the shape of the perimeter of outer surface 121 of seal ring 119, with the perimeter of inner surface 126 being offset inward from the perimeter of outer surface 121 at all points around the perimeter of outer surface 121 a sufficient distance to seal the outer periphery of the prefilters disposed below the bottom surface of seal ring 119. Thereby creating a through hole inside of the perimeter of inner surface 126, with the surface area of the through hole being substantially the same as the usable surface area of the final filter. Seal ring 119 is preferably press-fitted into vacuum filtration funnel 101, so that outer surface 121 of seal ring 119 presses against inner wall 102 of vacuum filtration funnel 101, so that bottom surface 122 of seal ring 119 presses against top surface 123 (i.e. the upstream surface) of second prefilter 117, thus sealing second prefilter 117 to vacuum filtration funnel 101. Because the downstream side of each layer of prefilter is in intimate contact with the upstream side of the prefilter or final filter below it, all layers of prefilter will be effectively sealed to vacuum filtration funnel 101, with a non-absolute seal by seal ring 119. However, any bypass that may occur around the outer edge of any layer of prefilter will be inconsequential. Because final filter 112 is sealed to vacuum filtration funnel 101 with a leak tight seal, there will not be any bypass to the downstream side of final filter 112. Alternately, seal ring 119 could be glued to vacuum filtration funnel 101, or solvent sealed to vacuum filtration funnel 101, or ultrasonically welded to vacuum filtration funnel 101, or sealed by any other means to vacuum filtration funnel 101. If second prefilter 117 is compressible (i.e. an absorbent pad depth filter), then seal ring 119 may be pressed into vacuum filtration funnel 101, deep enough to compress the outer periphery of second prefilter 117. If desired, additional layers of prefilter having the same diameter as final filter 112 could placed on top of second prefilter 117 before seal ring 119 is press-fitted into place. Alternately, second prefilter 117 could be eliminated, and seal ring 119 could be press-fitted into vacuum filtration funnel 101, so that bottom surface 122 of seal ring 119 presses against the top surface (i.e. the upstream surface) of first prefilter 116. Other combinations of prefilters could also be used. In the second embodiment of the prefilter constructed in accordance with the principles of the present invention all prefilters have the same diameter as the final filter.

The second embodiment of the disposable vacuum filtration funnel with integral prefilter is used in the same manner as the first embodiment is, as described above.

Figure 9:
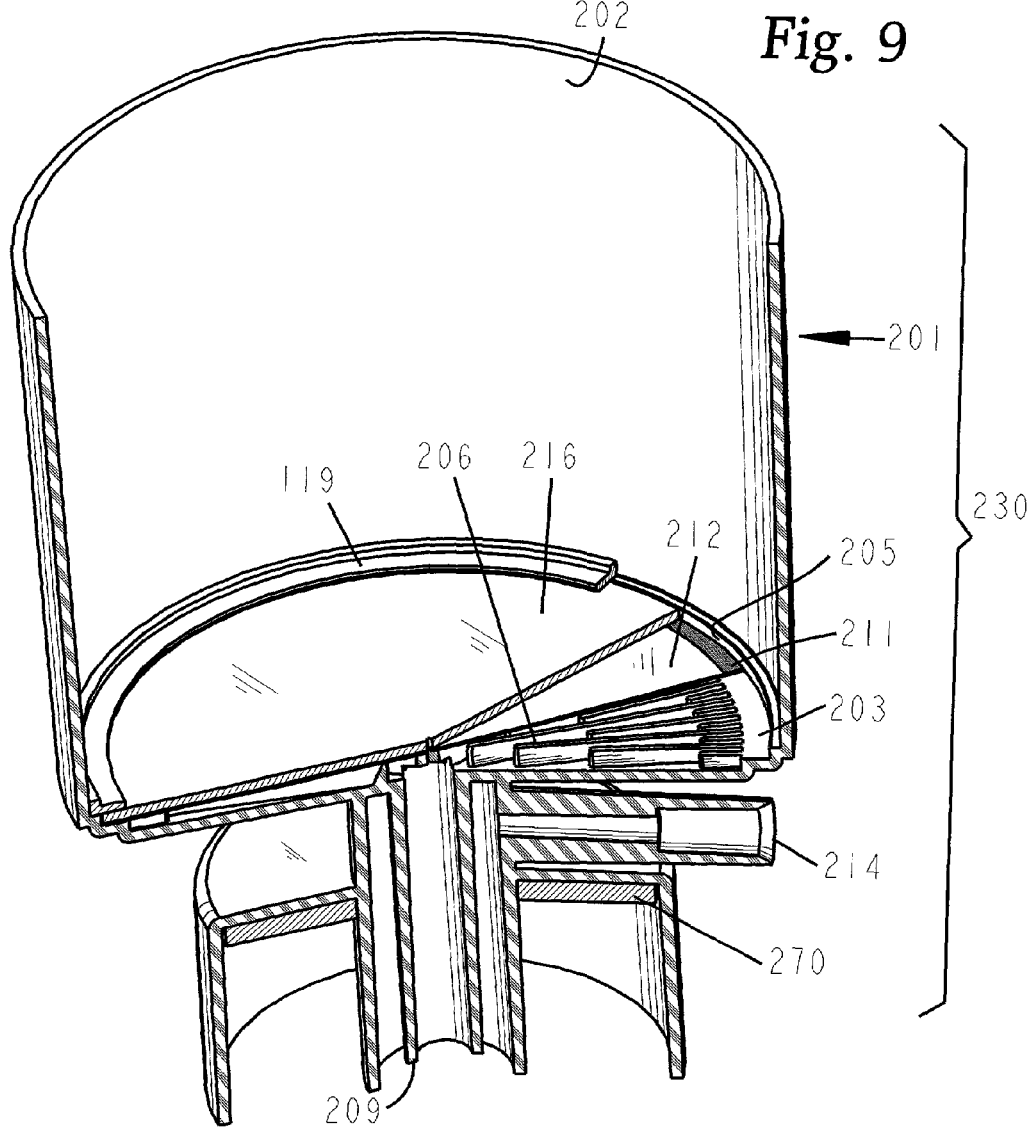
FIG. 9 is an isometric view, having portions thereof removed, of a third embodiment of an assembled funnel including a filter, one layer of prefilter, and a seal ring.
Figure 9A:
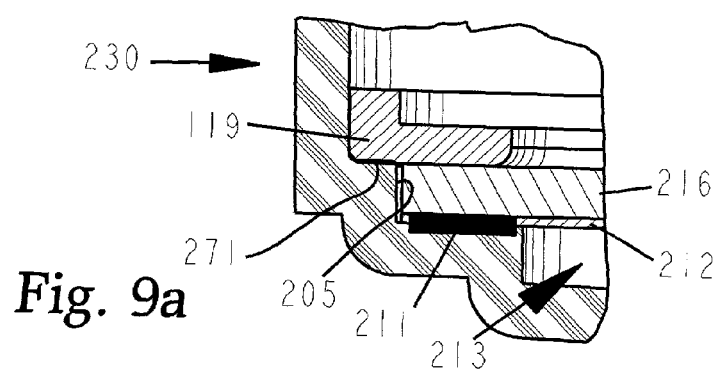
FIG. 9a is a partial cross-sectional view of the filter and prefilter seals of the funnel assembly depicted in FIG. 9.
Figure 10:
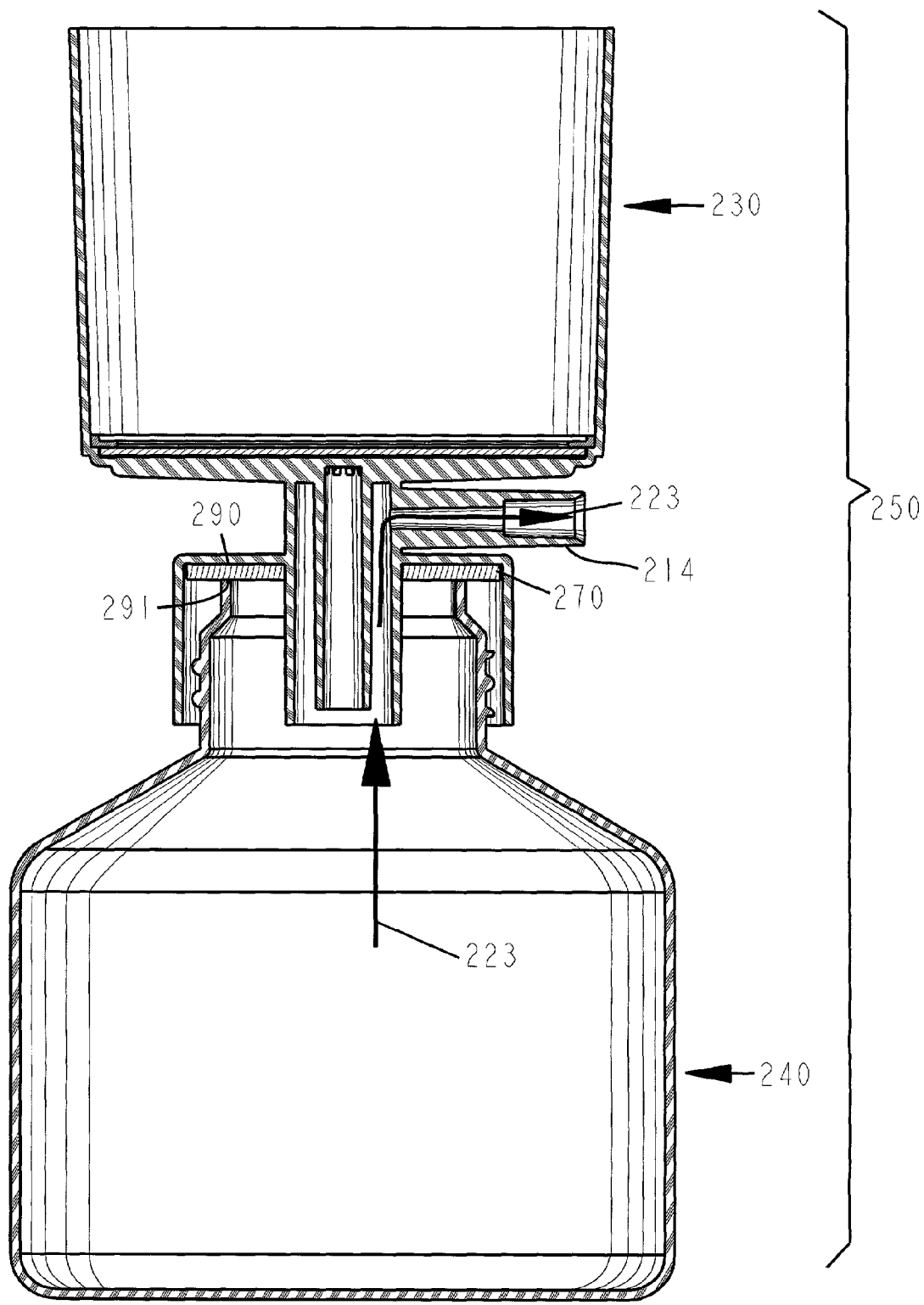
FIG. 10 is a cross-sectional view of a vacuum filtration apparatus with the assembled funnel depicted in FIG. 9, attached to a vacuum bottle, using a gasket compression seal.

A third embodiment of the disposable vacuum filtration funnel with integral prefilter constructed in accordance with the principles of the present invention, is shown in FIG. 8, FIG. 8a, FIG. 9, and FIG. 10. In this embodiment vacuum filtration funnel assembly 230 is sealed to vacuum bottle 240 by gasket 270. When vacuum bottle 240 is evacuated by applying a vacuum to the interior of vacuum tube 214 of vacuum filtration funnel 201, thus drawing the air out of vacuum bottle 240 via the path shown by arrows 223, vacuum filter funnel assembly 230 is pulled down by the negative pressure in the interior of vacuum bottle 240, thus compressing gasket 270 between surface 290 of vacuum filtration funnel 201 and top surface 291 of the neck of vacuum bottle 240, thereby creating a seal between vacuum filtration funnel assembly 230 and vacuum bottle 240. With this type of seal it may be necessary to push down on vacuum filtration funnel assembly 230 to begin the process of evacuating vacuum bottle 240. However, once a partial vacuum is attained gasket 270 will be sufficiently compressed to seal vacuum filtration funnel assembly to vacuum bottle 240. Referring to FIG. 9 and FIG. 9a vacuum filtration funnel 201 contains inner wall 202, which is typically round in shape, but could be of another shape such as square or rectangular. Vacuum filtration funnel 201 also contains filter seal surface 203, and seal ring stop surface 271. Filter seal surface 203 is recessed below seal ring stop surface 271 a distance equal to the height of recess side wall 205. The height of recess side wall 205 should be approximately equal to the sum of the thickness of the final filter that is sealed to filter seal surface 3, and the thickness of any prefilters that are placed on top of final filter 212. If it is desired to compress the prefilters with the seal ring then the height of recess side wall 205 should be equal to the sum of the thickness of the final filter that is sealed to filter seal surface 3, and the thickness of the prefilters that are placed on top of final filter 212, minus the desired compression thickness. Referring to FIG. 8, FIG. 8a, FIG. 9 and FIG. 9a, final filter 212 is sealed to filter seal surface 203 of vacuum filtration funnel 201 by seal 211. Seal 211 is preferably a heat seal, but could be an ultra-sonic seal, a solvent seal, a glue seal, or any other type of leak tight seal. First prefilter 216 is positioned on top of final filter 212, and has the same diameter as final filter 212. Seal ring 119 is preferably press-fitted into vacuum filtration funnel 201, so that outer edge 121 of seal ring 119 presses against inner wall 202 of vacuum filtration funnel 201, and so that bottom surface 122 of seal ring 119 presses against seal ring stop surface 271 of vacuum filtration funnel 201, and against the top surface (i.e. the upstream surface) of first prefilter 216, thus sealing first prefilter 216 to vacuum filtration funnel 201. Because the downstream side of first prefilter 216 is in intimate contact with the upstream side of final filter 212 below it, first prefilter 216 will be effectively sealed to vacuum filtration funnel 201, with a non-absolute seal. However, any bypass that may occur around the outer edge of first prefilter 216 will be inconsequential. Because final filter 212 is sealed to vacuum filtration funnel 201 with a leak tight seal, there will not be any bypass to the downstream side of final filter 212. Alternately, seal ring 119 could be glued to vacuum filtration funnel 201, or solvent sealed to vacuum filtration funnel 201, or ultrasonically welded to vacuum filtration funnel 201, or sealed by any other means to vacuum filtration funnel 201. If desired, additional layers of prefilter having the same diameter as final filter 212 could placed on top of first prefilter 216 before seal ring 119 is press-fitted into place. If it is desired to add additional layers of prefilter, then the height of recess side wall 205 should be adjusted accordingly as described above. In the third embodiment of the prefilter constructed in accordance with the principles of the present invention all prefilters have the same diameter as the final filter.

The third embodiment of the disposable vacuum filtration funnel with integral prefilter is used in the same manner as the first embodiment is, as described above.

Although the preferred embodiments have shown the reservoir portion of the funnel on the upstream side of the final filter vented to atmosphere, with a vacuum applied to the downstream side of the final filter, said vacuum used to suck unfiltered fluid through the prefilters disposed above the final filter, through the final filter, into the outlet of the funnel; the reservoir on the upstream side of the final filter could be pressurized, and the downstream side of the funnel vented to atmosphere, in which case the pressure applied to the fluid on the upstream side of the final filter would be used to force unfiltered fluid through the prefilters disposed above the final filter, through the final filter, into the outlet of the funnel. In this case a non-vented lid would be attached to the funnel, and a means (such as a hose barb) would be added to either the lid or to the funnel to apply pressure to the reservoir.

Although the preferred embodiments have shown the funnel attached to a vacuum bottle, the funnel may also be attached to a manifold, a flask or the like.

The preferred embodiments have shown the prefilter, weather composed of a single layer of prefilter material, or of multiple layers of prefilter material, sealed to the funnel with a single seal ring. However, multiple seal rings could also be used. As an example for a three layer prefilter, a first seal ring could be used to seal the first prefilter layer, a second seal ring could be used to seal the second prefilter layer, and a third seal ring could be used to seal the third prefilter layer. Alternately, the first and second prefilter layers could be sealed with a first seal ring, and the third layer of prefilter could be sealed with a second seal ring. Other combinations could also be used.

From the above detailed description of the various embodiments of the disposable vacuum filtration funnel with integral prefilter it will be appreciated by those skilled in the art that a prefilter constructed in accordance with the principles of the present invention can be used with any type of filtration funnel. Other filtration funnel assembly designs could be created by combining features from one embodiment with features from another embodiment.

Although the present invention has been shown and described in terms of specific preferred embodiments, it will be appreciated by those skilled in the art that changes or modifications are possible which do not depart from the inventive concepts described and taught herein. Such changes and modifications are deemed to fall within the purview of these inventive concepts.

What is claimed:

1. A filtration funnel with integral prefilter comprising:
    an open top funnel comprising a reservoir for holding unfiltered fluid therein and an outlet, said funnel further including an inner wall,
    a final microporous filter including an upstream side, and a downstream side, disposed between said reservoir and said outlet, said final filter sealed with a non-releasable leak-tight seal to said funnel to prevent unfiltered fluid from flowing between said final filter and said outlet, with the downstream side of said final filter in fluid flow communication with said outlet,
    one or more prefilters disposed between said reservoir and the upstream side of said final filter, with the pore size of said one or more prefilters being greater than or equal to the pore size of said final filter, said one or more prefilters including an upstream surface,
    a seal ring comprising a ring having a half cross-section with a substantially horizontal top surface, a substantially horizontal bottom surface, with an inner end surface extending from an inner edge of the top surface to an inner edge of the bottom surface, and with an outer end surface extending from an outer edge of the top surface to an outer edge of the bottom surface,
    the seal ring disposed inside of the funnel above said one or more prefilters, with the shape and size of the perimeter of the outer surface of the seal ring substantially matching the shape and size of the perimeter of a portion of the inner wall of the funnel adjacent to the outer surface of seal ring, with the shape of the perimeter of the inner surface of the seal ring being substantially the same as the shape of the perimeter of the outer surface of the seal ring, with the perimeter of the inner surface of the seal ring being offset inward from the perimeter of the outer surface of the seal ring at all points around the perimeter of the outer surface of the seal ring a sufficient distance to seal the outer periphery of the prefilters disposed below the bottom surface of the seal ring, thereby creating a through hole inside of the perimeter of the inner surface of the seal ring, with the surface area of the through hole being substantially the same as the usable surface area of the final filter,
    said seal ring sealed to said funnel, with the bottom surfaced of said seal ring pressing against the outer periphery of the upstream surface of said one or more prefilters, thereby sealing said one or more prefilters to said funnel with a non-absolute seal, thereby causing said unfiltered fluid to flow through said one or more prefilters before flowing through said final filter, thereby increasing the volume of fluid that the filtration funnel can filter.

2. The filtration funnel of claim 1 wherein the pore size of said microporous filter is less than or equal to 1.5 $\mu$m.

3. The filtration funnel of claim 2 wherein said one or more prefilters contain a first prefilter disposed above said final filter, and a second prefilter disposed above said first prefilter, and wherein the second prefilter has a pore size greater than the pore size of the final filter, and wherein the first prefilter has a pore size greater than the pore size of both the final filter and of the second prefilter, and wherein the structure of the first prefilter allows liquid to flow through the first prefilter both in the vertical and horizontal directions, thereby allowing the first prefilter to function as a flow distributor.

4. The filtration funnel of claim 3 wherein the second prefilter is a microporous filter.

5. The filtration funnel of claim 3 wherein said one or more prefilters contain a third prefilter, said third prefilter disposed above said second prefilter, said third prefilter being a depth filter capable of protecting said second prefilter.

6. The filtration funnel of claim 1 wherein said one or more prefilters contain a first prefilter, said first prefilter disposed above said final filter, said first prefilter being a depth filter capable of protecting said final filter.

7. The filtration funnel of claim 1 wherein said seal ring is sealed to said funnel with a press fit between the outer end surface of said seal ring, and the inner wall of said funnel.

8. The filtration funnel of claim 1 wherein said funnel contains a lid, and wherein a means is provided to pressurize the reservoir, and wherein the outlet is at atmospheric pressure, thereby creating a differential pressure between the top of said unfiltered fluid in said reservoir, and said outlet of said funnel, thereby forcing said unfiltered fluid from said reservoir, through said one or more prefilters, through said final filter, through said outlet.

9. The filtration funnel of claim 1 wherein an outer part of the top surface of said seal ring further includes a first upwardly inclined portion, and wherein an outer part of the bottom surface of said seal ring further includes a second upwardly inclined portion, with the outer end surface extending from the top of the first upwardly inclined portion to the top of the second upwardly inclined portion.

10. A filtration apparatus for filtering a fluid comprising:
    a filtration funnel with integral prefilter comprising:
        an open top funnel comprising a reservoir for holding unfiltered fluid therein and an outlet, said funnel further including an inner wall,
        a final microporous filter including an upstream side, and a downstream side, disposed between said reservoir and said outlet, said final filter sealed with a non-releasable leak-tight seal to said funnel to prevent unfiltered fluid from flowing between said final filter and said outlet, with the downstream side of said final filter in fluid flow communication with said outlet,
        one or more prefilters disposed between said reservoir and the upstream side of said final filter, with the pore size of said one or more prefilters being greater than or equal to the pore size of said final filter, said one or more prefilters including an upstream surface, a seal ring comprising a ring having a half cross-section with a substantially horizontal top surface, a substantially horizontal bottom surface, with an inner end surface extending from an inner edge of the top surface to an inner edge of the bottom surface, and with an outer end surface extending from an outer edge of the top surface to an outer edge of the bottom surface, the seal ring disposed inside of the funnel above said one or more prefilters, with the shape and size of the perimeter of the outer surface of the seal ring substantially matching the shape and size of the perimeter of a portion of the inner wall of the funnel adjacent to the outer surface of the seal ring, with the shape of the perimeter of the inner surface of the seal ring being substantially the same as the shape of the perimeter of the outer surface of the seal ring, with the perimeter of the inner surface of the seal ring being offset inward from the perimeter of the outer surface of the seal ring at all points around the perimeter of the outer surface of the seal ring a sufficient distance to seal the outer periphery of the prefilters disposed below the bottom surface of the seal ring, thereby creating a through hole inside of the perimeter of the inner surface of the seal ring, with the surface area of the through hole being substantially the same as the usable surface area of the final filter, said seal ring sealed to said funnel, with the bottom surface of said seal, ring pressing against the outer periphery of the upstream surface of said one or more prefilters, thereby sealing said one or more prefilters to said funnel with a non-absolute seal, thereby causing said unfiltered fluid to flow through said one or more prefilters before flowing through said final filter, thereby increasing the volume of fluid that the filtration funnel can filter, a means to collect filtered fluid from said outlet of said funnel, a means to apply a differential pressure between the top of said unfiltered fluid in said reservoir, and said outlet of said funnel.

11. The filtration apparatus of claim 10 wherein the means to collect filtered fluid from the outlet of said funnel is a bottle disposed below said funnel, with the outlet of said funnel in fluid flow communication with the interior of said bottle.

12. The filtration apparatus of claim 11 wherein a removable lid is attached to the open top of said funnel, and wherein a means is provided to allow air to flow between said lid and the top of said funnel, thereby venting the interior of the funnel when the removable lid is attached to the funnel, and wherein a vacuum is applied to the interior of said bottle, thereby creating a differential pressure between the top of said unfiltered fluid in said reservoir, and said outlet of said funnel, thereby sucking said unfiltered fluid from said reservoir, through said at least one prefilter, through said final filter, through said outlet, into said bottle.

13. The filtration apparatus of claim 11 wherein said funnel contains a lid, and wherein a means is provided to pressurize the reservoir, and wherein the interior of said bottle is vented to atmosphere, thereby creating a differential pressure between the top of said unfiltered fluid in said reservoir, and said outlet of said funnel, thereby forcing said unfiltered fluid from said reservoir, through said at least one prefilter, through said final filter, through said outlet, into said bottle.

14. The filtration funnel of claim 12 wherein the pore size of said microporous filter is less than or equal to 1.5 µm.

15. The filtration funnel of claim 12 wherein said one or more prefilters contain a first prefilter, said first prefilter disposed above said final filter, said first prefilter being a depth filter capable of protecting said final filter.

16. The filtration funnel of claim 14 wherein said one or more prefilters contain a first prefilter disposed above said final filter, and a second prefilter disposed above said first prefilter, and wherein the second prefilter has a pore size greater than the pore size of the final filter, and wherein the first prefilter has a pore size greater than the pore size of both the final filter and of the second prefilter, and wherein the structure of the first prefilter allows liquid to flow through the first prefilter both in the vertical and horizontal directions, thereby allowing the first prefilter to function as a flow distributor.

17. The filtration funnel of claim 16 wherein the second prefilter is a microporous filter.

18. The filtration funnel of claim 16 wherein said one or more prefilters contain a third prefilter, said third prefilter disposed above said second prefilter, said third prefilter being a depth filter capable of protecting said second prefilter.

19. A filtration funnel with integral prefilter comprising:
a funnel comprising a reservoir for holding unfiltered fluid therein and an outlet, said funnel further including an inner wall, a final microporous filter including an upstream side, and a downstream side, disposed between said reservoir and said outlet, said final filter sealed with a non-releasable leak-tight seal to said funnel to prevent unfiltered fluid from flowing between said final filter and said outlet, with the downstream side of said final filter in fluid flow communication with said outlet, one or more prefilters disposed between said reservoir and the upstream side of said final filter, with the pore size of said one or more prefilters being greater than or equal to the pore size of said final filter, said one or more prefilters including an upstream surface, a seal ring comprising a ring having a half cross-section with a substantially horizontal top surface, a substantially horizontal bottom surface, with an inner end surface extending from an inner edge of the top surface to an inner edge of the bottom surface, and with an outer end surface extending from an outer edge of the top surface to an outer edge of the bottom surface, the seal ring disposed above said one or more prefilters, with the shape and size of the perimeter of the outer surface of the seal ring substantially matching the shape and size of the perimeter of a portion of the inner wall of the funnel adjacent to the outer surface of seal ring, with the shape of the perimeter of the inner surface of the seal ring being substantially the same as the shape of the perimeter of the outer surface of the seal ring, with the perimeter of the inner surface of the seal ring being offset inward from the perimeter of the outer surface of the seal ring at all points around the perimeter of the outer surface of the seal ring a sufficient distance to seal the outer periphery of the prefilters disposed below the bottom surface of the seal ring, thereby creating a through hole inside of the perimeter of the inner surface of the seal ring, said seal ring sealed to said funnel, with the bottom surface of said seal ring pressing against the outer periphery of the upstream surface of said one or more prefilters, thereby sealing said one or more prefilters to said funnel with a non-absolute seal, thereby causing said unfiltered fluid to flow through said one or more prefilters before flowing through said final filter, thereby increasing the volume of fluid that the filtration funnel can filter.

20. The filtration funnel of claim 19 wherein an outer part of the top surface of said seal ring further includes a first upwardly inclined portion, and wherein an outer part of the bottom surface of said seal ring further includes a second upwardly inclined portion, with the outer end surface extending from the top of the first upwardly inclined portion to the top of the second upwardly inclined portion.

* * * * *